United States Patent [19]

Shields

[11] 4,417,679
[45] Nov. 29, 1983

[54] AMPULE OPENER

[76] Inventor: Walter Shields, 181-41 Henley Rd., Jamaica, N.Y. 11432

[21] Appl. No.: 316,470

[22] Filed: Oct. 30, 1981

[51] Int. Cl.³ .......................... B26F 3/00; C03B 33/06
[52] U.S. Cl. ......................................... 225/93; 83/80; 83/100; 225/96.5; 241/99
[58] Field of Search ........................ 225/93, 96.5, 103; 241/99; 83/100, 80

[56] References Cited

U.S. PATENT DOCUMENTS 3,552,083 1/1971 Andersen et al. ................ 241/99 X
4,353,869 10/1982 Guth .................................. 241/99 X Primary Examiner—Frank T. Yost
Attorney, Agent, or Firm—Jordan and Hamburg

[57] ABSTRACT

An opener for an ampule having a head and a body to prevent contamination of material in an ampule from particles formed when the ampule is opened comprises at least one opening mechanism including a head holder and an annular flexible jacket situated around an end of the head holder to extend outwardly therefrom. The head holder includes a hole with a cylindrical opening at one end for receiving at least a part of the head of the ampule, and an outlet communicating with the hole. The inner diameter of the flexible jacket is almost the same as the outer diameter of the body of the ampule to be opened. The outlet of the head holder is connected to a vacuum source to inspire air through the hole. Therefore, the head and the body of the ampule are respectively located in the hole and the flexible jacket, and then the body is bent, so that the particles formed by thereby snapping apart the ampule are inspired with air into the vacuum source.

16 Claims, 10 Drawing Figures

AMPULE OPENER

BACKGROUND OF THE INVENTION

The invention relates to an apparatus for opening an ampule, more particularly an ampule opener for preventing contamination of material in the ampule when the ampule is snapped open.

Injection liquid is generally stored in an ampule in a single dose quantity, and the ampule is opened when the dose is to be injected. The ampule is made of glass and is provided with a cutting line in a neck portion between the head and body of the ampule, so that when the head is pushed or bent, the ampule is thereby easily snapped open. When snapped, however, the ampule is not always cut along the cutting line, and sometimes the head of the ampule is broken so that the person opening the ampule may be cut.

When opening the ampule, there is another serious problem. Namely, when the ampule is snapped, even if the head is perfectly cut along the cutting line, glass flakes or powder are formed and are mixed into the injection liquid. Therefore, the liquid in the ampule has to be carefully drawn into a syringe in order not to include the glass flakes or powder therein; in such case, the injection liquid cannot be used completely, and a little amount of the liquid in the bottom of the ampule has to be always discarded.

Accordingly, an object of the invention is to provide an ampule opener to prevent contamination of material in an ampule by particles when the ampule is opened.

Another object of the invention is to provide an ampule opener as stated above, in which the ampule can be easily and safely opened by simple snapping of the ampule.

A further object of the invention is to provide an ampule opener as stated above, in which the opener can be simply and economically manufactured.

Further objects and advantages of the invention will be apparent from the following description of the invention.

SUMMARY OF THE INVENTION

In accordance with the invention, an ampule opener for opening an ampule is provided, which prevents contamination of material in the ampule by particles formed when the ampule is opened. The ampule opener basically comprises at least one opening mechanism including a head holder and an annular flexible jacket situated around an end of the head holder to extend outwardly therefrom. The head holder is provided with a hole having a cylindrical opening at one end for receiving therein at least a part of a head of the ampule, and an outlet communicating with that hole. The inner diameter of the flexible jacket is almost the same as the outer diameter of the body of the ampule to be opened.

The outlet of the head holder is connected to vacuum means to inspire air through the cylindrical opening so that when the head and the body of the ampule are respectively located in the hole and the flexible jacket and then the body of the ampule is bent together with the flexible jacket, the particles formed by snapping of the ampule are inspired into the vacuum means. Actuating means is preferably provided to effect communication of the opening mechanism with the vacuum means when the ampule is situated in the opening mechanism.

The cylindrical opening of the head holder includes a tapered zone converging conically inwardly toward the hole for permitting easy inserting of the ampule into the hole, and at least one groove formed on the tapered zone. When the ampule is situated in contact with the tapered zone for being snapped open, air is inspired into the hole through the groove. Preferably, four grooves are provided on the tapered zone. The annular flexible jacket includes a plurality of small apertures in the middle portion thereof for inspiration of air therethrough when the ampule is to be snapped open. Specifically, when the ampule is snapped open, the particles formed by snapping open of the ampule are conveyed to the vacuum source through the groove and the hole by the air passing through the small apertures.

The opening mechanism is attached to supporting means having a passage therein communicating with said vacuum means. The opening mechanism is connected to the supporting means such that the cylindrical opening is directed downwardly and the outlet is in communication with the passage. Generally, a plurality of opening mechanisms are provided and connected to the supporting means. Exactly the same opening mechanisms may be attached to the supporting means, but preferably the hole and the annular flexible jacket in each opening mechanism are different in diameter for receiving and opening different sizes of the ampules in respective opening mechanisms.

The actuating means comprises a plurality of first valves situated between the outlet of the opening mechanism and the passage of the supporting means respectively, a plurality of first switches controlling the first valves, a second valve located between the passage of the supporting means and the vacuum means, and at least one second switch for controlling the second valve to selectively effect communication of the passage with the vacuum means. In this case, the second switch is at first turned on to open the second valve, and then the desired first switch is actuated to open the first valve, so that air is drawn into the vacuum means through the hole of the opening mechanism in which the first valve is opened.

The first switch is provided with a switch lever located behind the opening mechanism. When the switch lever is moved to turn on the first switch, the ampule in the opening mechanism can only be moved for snapping open from a diagonal position to a vertical position. In case a plurality of second switches is provided, each second switch has to be associated with each first switch. Namely, when the switch lever is moved, at first the second switch is turned on to open the second valve and then the first switch is operated for opening the first valve.

DETAILED DESCRIPTION OF PREFERRED EMBODIMENTS

An ampule opener in accordance with the present invention is directed to a device to open an ampule containing therein medical liquid for injection. The ampule to be opened herein includes, as usual, a head H, a body B and a neck N, and a cutting line is provided along the neck N. When the ampule A is opened, the head H is pushed or bent relative to the body B to snap at the cutting line.

Figure 1:
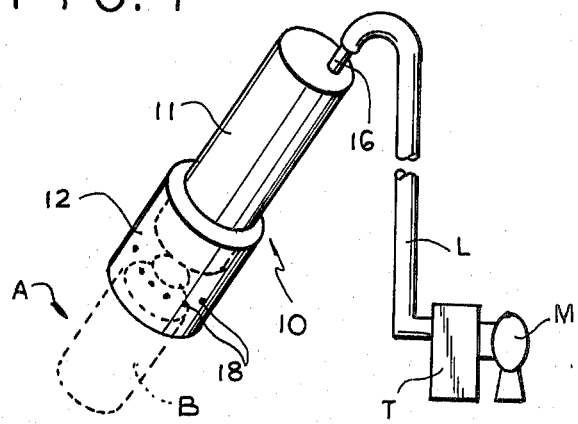
FIG. 1 is a perspective view showing an ampule opener in accordance with the present invention.
Figure 2:
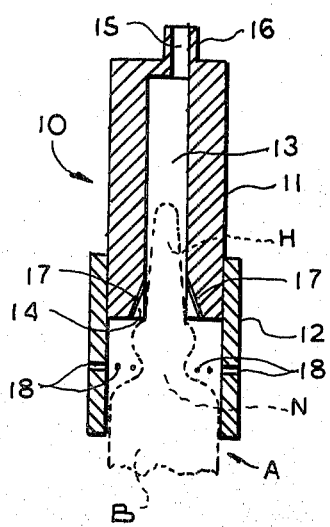
FIG. 2 is a sectional view of the ampule opener as shown in FIG. 1.
Figure 3:
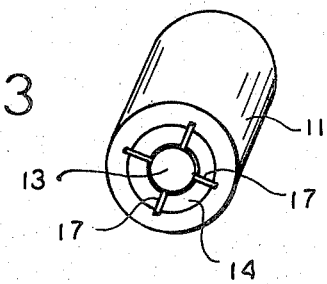
FIG. 3 is a perspective view of a head holder of the ampule opener showing a tapered zone thereof.

Referring to FIGS. 1–3, a first embodiment of the ampule opener in accordance with the invention is shown. An opening mechanism 10 of the ampule opener comprises a cylindrical head holder 11 and a flexible jacket 12 attached to the head holder 11. The head holder 11 is provided with a central hole 13 having a tapered zone 14 at one end and an outlet 15 with an outlet projection 16 at the other end thereof. The tapered zone 14 is converging conically inwardly of the hole 13 and is provided with four grooves 17 on the conical surface thereof. The tapered zone 14 serves to easily conduct the head H of the ampule A into the hole 13 for insertion thereof and to locate the head H in abutment therewith. When the ampule A is inserted into the hole 13 to abut a part of the head H against the tapered zone 14, the hole 13 can still communicate outside through the grooves 17 on the tapered zone 14.

The outlet projection 16 of the head holder 11 is connected to a vacuum tank T having a vacuum motor M through a line L. When the motor M is operated, therefore, air is inspired from the hole 13 through the outlet 15 and the line L.

The flexible jacket 12 is connected to the head holder 11 by an adhesive material or a tightening band (not shown). The jacket 12 extends downwardly beyond the end of the tapered zone 14 and is provided with a plurality of small apertures 18 in the middle portion thereof, through which air can pass. When the ampule A is inserted into the hole 13, a shoulder portion of the body B of the ampule A is also situated in the jacket 12 to thereby substantially close an open end of the jacket 12. In this condition, air can flow in and out through the small apertures 18.

In operation, the motor M is started to draw air into the tank T from the hole 13 through the line L. Then, the ampule A to be opened is inserted into the head holder 11 such that the head H of the ampule A is almost completely located inside the hole 13 to abut a spherical portion of the head H against the tapered zone 14. In this condition, the shoulder portion of the body B of the ampule A is located within the flexible jacket 12. Accordingly, air is drawn into the tank T through the apertures 18 and the grooves 17.

The body B of the ampule A together with the jacket 12 is bent relative to the head holder 11, so that since the head H is located in the hole 13 of the head holder 11, the body B is snapped against the head H along the cutting line of the neck N. When the ampule A is cut, glass flakes are formed by snapping the ampule, but the glass flakes are carried by the air passing through the apertures 18 and transmitted into the tank T through the grooves 17 and the line L. Therefore, the medical liquid in the ampule A is not contaminated by the glass flakes due to cutting of the head H.

In case the head H is not cut along the cutting line and is broken into pieces, all the pieces are still carried into the tank T by the air. If a top portion of the head H is broken and is inspired into the hole 13, the top portion cannot pass through the inlet 15. However, in order that the inlet 15 not be blocked by this kind of piece, the inlet 15 is biasedly situated relative to the hole 13. Therefore, the top portion is held in the hole 13 and other glass flakes are still inspired into the tank T through the inlet 15. While the vacuum motor M is operating, the head H cut along the cutting line is also held in the hole 13 by vacuum.

After cutting the head H from the body B, the body B is removed from the jacket 12, and then the vacuum motor M is turned off. Consequently, the glass pieces remain in the hole 13, i.e., the top portion of the head H as stated above, and the head H drops therefrom. When the vacuum motor is turned on, the opening mechanism 10 can be used again. The air drawn into the tank T is filtered to remove the glass flakes and is exhausted therefrom.

As stated above, when the ampule A is snapped, the ampule A should be located such that the head H and the neck N are respectively situated in the hole 13 and the jacket 12. Further, the shoulder portion of the body B should be substsantially located in the jacket 12. Namely, the inner diameters of the hole 13 and the jacket 12 must be slightly larger than the outer diameters of the head H and the body B. If the head H is too much smaller in diameter than the hole 13, the head H cannot be properly supported or held by the head holder 11. If the body is small in diameter, a great amount of air comes through the space between the jacket 12 and the body B, so that sufficient air speed flowing into the hole 13 through the grooves 17 cannot be obtained and, therefore, the glass flakes cannot be carried by the air.

Referring now to FIGS. 4–8, a second embodiment of the ampule opener of the invention is shown. In the second embodiment, four opening mechanisms 20, 21, 22, 23 are the same as the opening mechanism 10 except that the second opening mechanisms do not have the outlet projection 16 but have screw threads 25 on the head holder to attach the same to the horizontal frame 24. The opening mechanisms 20, 21, 22, 23 are designed to open three different size ampules, i.e., the opening mechanism 20 for large size ampules, the opening mechanisms 21, 22 for medium size ampules, and the opening mechanism 23 opening for small size ampules. The differences of these opening mechanisms are only sizes of the hole 13 and the jacket 12.

The horizontal frame 24 for supporting the opening mechanisms 20, 21, 22, 23 is attached to a vertical frame 26 which is connected to a bottom plate 27. The bottom plate 27 may be put on a stand or table. Two boxes 28 are disposed on the bottom plate 27 for receiving the head H of the ampule A after it is cut.

The horizontal frame 24 is provided with a passage 29 extending almost the entire longitudinal length thereof and four attachment openings 30 having threads 31 on inner surfaces thereof. Each attachment opening 30 includes a depression 32 at an innermost end, from which a path 33 extends to effect communication of the depression 32 with the passage 29. The openings 30 are obliquely situated relative to a vertical line to attach the opening mechanisms to the horizontal frame. The screw threads on the head holders engage the respective threads 31 of the openings. When the ampule A is put in the obliquely located opening mechanism and is snapped downwardly, the snapped body B of the ampule A is substantially directed vertically so that medical liquid in the body B is not spilled.

Figure 6:
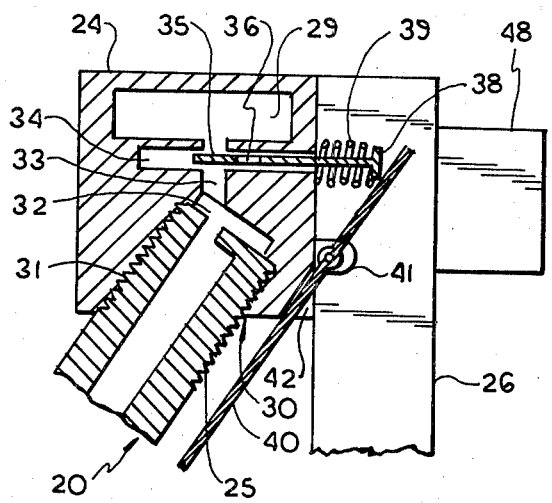
FIG. 6 is an enlarged sectional view taken along lines 6—6 in FIG. 4.

In the path 33, a space 34 is provided to receive therein a valve plate 35, which includes an aperture 36 in the center and a rod portion 37 with a stopper 38. When the plate 35 is located in the space 34, a spring 39 is disposed around the rod portion 37 to urge the plate 35 to pull out from the space 34. The stopper 38 serves to keep the spring 39 on the rod portion 37. The aperture 36 has almost the same diameter as that of the path 33, and when the plate 35 is pushed into the space 34 to a predetermined extent, the aperture 36 lines up with the path 33 to effect communication of the depression 32 with the passage 29. In FIG. 6, the path 33 is closed by the plate 35.

For operating the respective valve plates 35, levers 40 are provided behind the opening mechanisms. Namely, four pairs of supporting projections 41 are located below the respective springs 39 and are connected to the horizontal frame 24 so that each lever 40 is rotationally supported by a pair of supporting projections 41. Depressions 42 are formed on an edge of the frame 24 below the respective pair of projections 41. The lever 40 passes through the depression 42 when the lever 40 is in a nonoperating position extending parallel to the opening mechanism. The lever 40 is held in this position by the force of the spring 39. The lever 40 is provided with a plate 43 having a pushing portion 44. The plate 43 serves to lead the snapped off head H of the ampule A in the head holder to the box 28 located below the opening mechanism after the body B of the ampule A is removed from the opening mechanism. The pushing portion 44 is designed for easy pushing of the lever 40 while the ampule A is situated in the opening mechanism.

Figure 4:
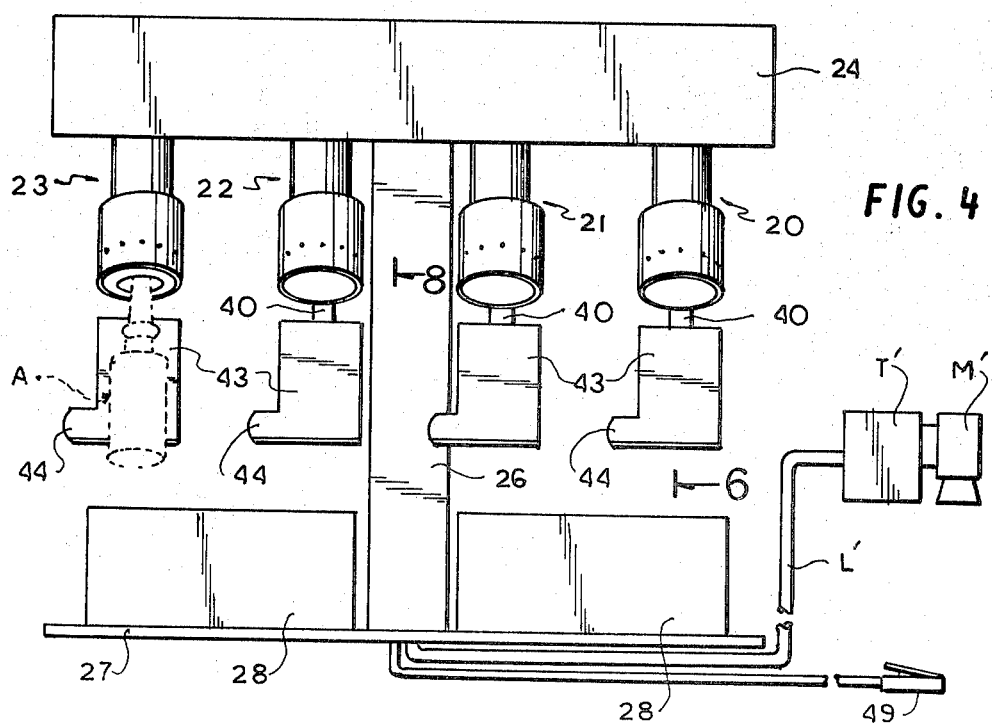
FIG. 4 is a front view of another embodiment of the ampule opener in accordance with the invention.
Figure 5:
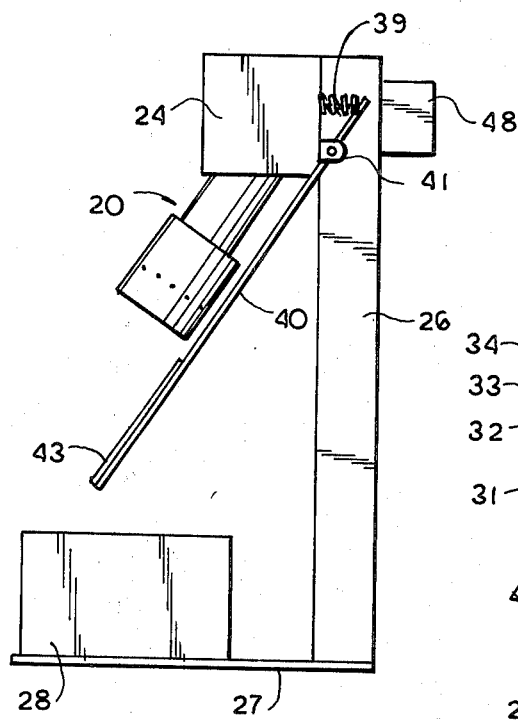
FIG. 5 is a side view of the ampule opener as shown in FIG. 4.
Figure 8:
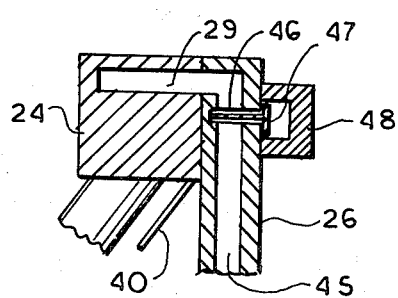
FIG. 8 is a sectional view taken along lines 8—8 in FIG. 4.
Figure 7:
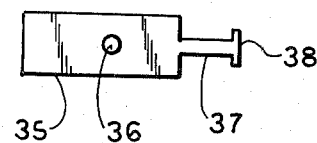
FIG. 7 is a plan view of a first valve plate of the ampule opener as shown in FIG. 6.

As shown in FIG. 8, the passage 29 in the horizontal frame 24 communicates with a passage 45 in the vertical frame 26. The passage 45 is thereafter connected to a vacuum tank T' through a line L'. In the passage 45, there is provided a space 46 in which a valve plate 47 is situated. Movement of the valve plate 47 is controlled by electromagnetic means 48 operated by a foot switch 9 (FIGS. 4 and 8). When the foot switch 49 is pushed, the electromagnetic means 48 operates to pull the valve plate 47 for opening the passage 45.

In the second embodiment of the ampule opener, a vacuum motor M' is intermittently operated to keep the vacuum tank T' at a predetermined low pressure. Therefore, when the valve plates 35, 47 are opened, air is drawn into the vacuum tank T' through the opening mechanism.

In operation, the foot switch 49 is at first pushed to open the valve plate 47. Then, the ampule A to be snapped open is located in one of the opening mechanisms 20-23 as explained in connection with the first embodiment. In this position, the plate 43 is pushed inwardly to open the path 33. Consequently, air is inspired through the particular opening mechanism. The ampule A in the opening mechanism is moved to snap off the head H and the body B of the ampule A is then removed therefrom. In this condition, air is still inspired, so that the head H is located in the opening mechanism due to vacuum force of the air. Then, the lever 40 is returned to the first position to stop air inspiration through the opening mechanism. Consequently, the head H in the head holder moves downwardly and falls into the box 28 along the plate 43. The foot switch 49 is finally released. While the foot switch 49 is turned on, it is possible to use all the open mechanisms at one time.

Figure 9:
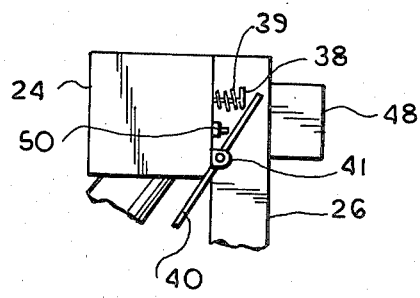
FIG. 9 is a side view showing a second embodiment of switch means of the ampule opener.

In the embodiment shown in FIG. 9, switches 50 are provided instead of the foot switch 49 in the second embodiment, to be operated by the respective levers 40. Namely, each switch 50 is located between the spring 39 and the supporting projections 41. When the lever 40 is moved downwardly, the switch 50 is at first turned on to operate the electromagnetic means 48 to move the valve plate 47 out of the passage 45, and thereafter when the lever 40 is further moved downwardly, the aperture 36 of the valve plate 35 lines up with the path 33 to effect communication of the passage 29 with the depression 32. In this position, air is inspired into the vacuum tank T through the opening mechanism. In case the lever 40 is moved to a first position, the path 33 is at first closed and then the electromagnetic means 48 is operated to close the passage 45. In case the several opening mechanisms are being used at the same time, while one of the switches 50 is turned on, the electromagnetic means 48 operates to locate the valve plate 47 in the open position. Therefore, all the opening mechanisms can be used independently.

Figure 10:
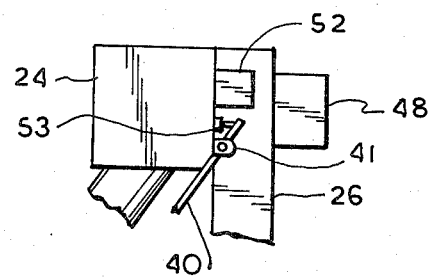
FIG. 10 is a side view showing a third embodiment of the switch means of the ampule opener.

In FIG. 10, another embodiment of the ampule opener is shown, in which valve plates 51 (not shown) the same as the valve plate 47 are situated in the spaces 34 instead of the valve plates 35, and electromagnetic means 42 the same as the electromagnetic means 48 are attached to the horizontal frame 24 to operate the respective valve plates 51. Further, switches 53 are provided instead of the switches 50 in FIG. 9. The switch 53 is a double stage type, and when the lever 40 is moved downwardly, a first stage switch works at first to operate the electromagnetic means 48 to open the passage 45, and when the lever 40 is moved further, a second stage switch works to operate the valve plate 51 to open the path 33. When the lever 40 is returned to a first position, at first the path 33 is closed and then the passage 45 is closed by the respective electromagnetic means 52 and 48. While one of the first stage switches is turned on, the passage 45 is opened. Therefore, the opening mechanism can be used separately and independently.

While the invention has been described with reference to specific embodiments, it is to be noted that the description is illustrative and the invention is limited only by the appended claims.

What I claim is:

1. An ampule opener for an ampule having a head and a body, the ampule opener being adapted to prevent contamination of material in the ampule by particles formed in snap-opening the ampule, comprising
    a holder for the ampule head having a cylindrical opening at one end, a hole extending inwardly from the cylindrical opening for receiving therein at least a part of the head of the ampule, and an outlet communicating with the hole, said outlet being adapted to be connected to a vacuum source to inspire air through said opening, and
    an annular flexible jacket situated around the end of the head holder to extend outwardly therefrom, said flexible jacket having an inner diameter almost the same as the outer diameter of the body of the ampule to be opened, so that when the ampule is positioned so that the head and the body are respectively located in the hole and the flexible jacket and then the body of the ampule is bent together with the flexible jacket to snap the head from the ampule, the particles formed by the snapping off of the ampule will be inspired into the vacuum source, thereby not contaminating the material in the ampule.

2. An ampule opener according to claim 1, in which said cylindrical opening of the head holder includes a tapered zone converging conically inwardly toward the hole for easy inserting of the ampule into the hole, and further comprising at least one groove formed on the tapered zone for inspiration of air into the hole therethrough when the ampule is situated in contact with the tapered zone for snapping off the head thereof.

3. An ampule opener according to claim 2, in which said annular flexible jacket includes a plurality of small apertures in the middle portion thereof for inspiration of air therethrough when the ampule is positioned for snapping off the head therefrom, so that when the ampule head is snapped off, the particles formed by the snapping off are conveyed to the vacuum source by the air passing through the small apertures.

4. An ampule opener according to claim 1, in which an axis of the outlet of the head holder is biasedly situated relative to an axis of the hole so that if the head of the ampule is inspired into the hole, the head does not block air flow toward the outlet from the hole.

5. An apparatus for opening an ampule having a head and a body without contaminating material in the ampule by particles formed in snap-opening, comprising:

at least one opening mechanism including a holder for the ampule head having a hole with a cylindrical opening at one end thereof for receiving therein at least a part of the head of the ampule and an outlet communicating with said hole, and an annular flexible jacket situated around the end of the head holder to extend outwardly therefrom, said flexible jacket having almost the same diameter as that of the body of the ampule to be opened, vacuum means connected to said outlet of said head holder to inspire air through the cylindrical opening so that when the head and the body of the ampule are respectively located in the hole and the flexible jacket and then the body of the ampule is bent together with the flexible jacket, the particles formed by snapping apart of the ampule are inspired with the air into the vacuum means, and actuating means to effect communication of the opening mechanism with the vacuum means when the ampule is positioned in the opening mechanism.

6. An apparatus for opening ampules according to claim 5, in which said cylindrical opening of the head holder includes a tapered zone converging conically inwardly toward the hole for easy inserting of the ampule into the hole, and at least one groove formed on the tapered zone for inspiration of air into the hole therethrough when the ampule is situated in contact with the tapered zone for snapping open of the ampule.

7. An apparatus for opening an ampule according to claim 6, in which said annular flexible jacket includes a plurality of small apertures in the middle portion thereof for inspiration of air therethrough when the ampule is positioned for being snapped open, so that when the ampule is snapped open, the particles formed thereby are conveyed to the vacuum source by air passing through the small apertures.

8. An apparatus for opening ampules according to claim 7, further comprising supporting means to support said opening mechanism, the supporting means having a passage therein to communicate with said vacuum means, said opening mechanism being connected to said supporting means so that the cylindrical opening is directed downwardly and the outlet communicates with said passage.

9. An apparatus for opening ampules according to claim 8, in which a plurality of opening mechanisms are provided and are connected to said supporting means.

10. An apparatus for opening ampules according to claim 9, in which the hole and the annular flexible jacket in each opening mechanism are different in diameter for receiving and opening different size ampules in respective opening mechanisms.

11. An apparatus for opening ampules according to claim 9, in which said actuating means comprises a plurality of first valves situated between the outlet of the opening mechanism and the passage of the supporting means respectively, a plurality of first switches, each controlling a predetermined one of the first valves selectively to effect communication of the outlet with the passage, a second valve located between the passage of the supporting means and the vacuum means, and at least one second switch for controlling the second valve selectively to effect communication of the passage with the vacuum means.

12. An apparatus for opening ampules according to claim 11, in which said first switch is provided with a switch lever located behind the opening mechanism, so that when the switch lever is moved to turn on the first switch, the ampule to be opened can be snapped from a diagonal position to a vertical position.

13. An apparatus for opening ampules according to claim 12, in which said second switch is a foot switch to be operated before one of the first switches is turned on.

14. An apparatus for opening ampules according to claim 12, in which a plurality of second switches is provided to be operated by the switch levers of the first switches so that when the switch lever is moved downwardly, at first the second switch is turned on to open the second valve and then the first switch is operated for opening the first valve.

15. An apparatus for opening ampules according to claim 14, in which said second valve is an electromagnetic valve to be operated in an actuating position as long as at least one of the second switches is turned on.

16. An apparatus for opening ampules according to claim 15, in which said first valves are electromagnetic valves, and said first and second switches for operating one opening mechanism are mechanically combined together for properly actuating first and second valves due to movement of the switch lever.

* * * * *